United States Patent
Shimahara et al.

(10) Patent No.: US 8,280,397 B2
(45) Date of Patent: Oct. 2, 2012

(54) MOBILE TELEPHONE UNIT WITH BROADCAST RECEIVING FUNCTION

(75) Inventors: Akihito Shimahara, Osaka (JP); Yuichi Taneya, Osaka (JP)

(73) Assignee: Kyocera Corporation, Kyoto (JP)

( * ) Notice: Subject to any disclaimer, the term of this patent is extended or adjusted under 35 U.S.C. 154(b) by 1373 days.

(21) Appl. No.: 10/588,236

(22) PCT Filed: Jan. 20, 2005

(86) PCT No.: PCT/JP2005/000688
§ 371 (c)(1),
(2), (4) Date: Apr. 12, 2007

(87) PCT Pub. No.: WO2005/076486
PCT Pub. Date: Aug. 18, 2005

(65) Prior Publication Data
US 2007/0259684 A1 Nov. 8, 2007

(30) Foreign Application Priority Data
Feb. 6, 2004 (JP) .................................. 2004-030693

(51) Int. Cl.
*H04M 3/42* (2006.01)
(52) U.S. Cl. ..................... 455/456.1; 455/414.1
(58) Field of Classification Search .............. 455/3, 457, 455/456, 404.2; 709/220; 707/1
See application file for complete search history.

(56) References Cited

U.S. PATENT DOCUMENTS

| 5,212,822 | A * | 5/1993 | Fukumine et al. | 455/435.3 |
| 2003/0092375 | A1 * | 5/2003 | Iwanaga et al. | 455/3.01 |
| 2004/0192346 | A1 * | 9/2004 | Chang et al. | 455/456.1 |

FOREIGN PATENT DOCUMENTS

| JP | 8-162909 | 6/1996 |
| JP | 11-88123 | 3/1999 |
| JP | 2000-40973 | 2/2000 |
| JP | 2002-118478 | 4/2002 |
| JP | 2004-23753 | 1/2004 |

* cited by examiner

*Primary Examiner* — George Eng
*Assistant Examiner* — Nizar Sivji
(74) *Attorney, Agent, or Firm* — Duane Morris LLP; Richard C. Kim (57) ABSTRACT

A mobile phone having a broadcast receiving function that can promptly preset a receiving frequency depending on areas, and easily receive a broadcast of a broadcast station having the receiving frequency, even when a user moves around for a pleasure or business trip. The mobile phone has a broadcast receiving unit that receives a broadcast, including: a memory operable to store position information of a base station corresponding to a receiving frequency of a broadcast station receivable in an area indicated by the position information; and a control unit operable to acquire the position information of the base station, judge whether the acquired position information is stored in the memory, and when stored, read a receiving frequency corresponding to the acquired position information, and instruct the broadcast receiving unit to receive a broadcast of the broadcast station having the receiving frequency.

24 Claims, 6 Drawing Sheets

| COUNTRY · AREA | FREQUENCY RANGE (MHz) | STEP FREQUENCY (KHz) | AUDIO DEEMPHASIS AMOUNT (μs) |
|---|---|---|---|
| USA | 87.9~107.9 | 200 | 75 |
| CANADA | 87.5~107.9 | 200 | 75 |
| HAWAII | 87.5~107.9 | 200 | 75 |
| ENGLAND | 87.5~108 | 50 | 50 |
| RUSSIA | 66~73 | 50 | 50 |
| JAPAN | 76~90 | 50 | 50 |
| KOREA | 87.5~108 | 50 | 50 |
| ... | ... | ... | ... |

FIG.3

| AREA INFORMATION | PRESET 1 (MHz) | PRESET 2 (MHz) | PRESET 3 (MHz) | PRESET 4 (MHz) |
|---|---|---|---|---|
| 001 | 87.9 | 93.1 | 94.1 | 100.7 |
| 002 | 94.5 | 96.7 | 99.1 | 100 |
| 003 | 93.9 | — | — | — |
| ... | ... | ... | ... | ... |

MOBILE TELEPHONE UNIT WITH BROADCAST RECEIVING FUNCTION

BACKGROUND OF THE INVENTION

1. Field of the Invention

The present invention relates to a mobile phone having a broadcast receiving function, and specifically to a technology for presetting a receiving frequency.

2. Description of the Related Art

With rapid multifunctionalization of mobile phones in recent years, mobile phones having broadcast receiving devices have become available.

Broadcast receiving devices have an auto preset function for easily selecting frequencies. In such auto preset function, a receiving signal is detected beforehand using a receiving station searching function by frequency sweeping such as scanning and seeking. When a signal level exceeds a predetermined value, the sweeping is temporarily suspended, and frequency data corresponding to a receiving frequency at a time of the suspension is stored on a memory. And then, the sweeping is restarted to detect the receiving signal.

This allows a user to easily receive and listen to a broadcast of a desired broadcast station by executing an auto preset function and selecting a frequency prestored on the memory.

Japanese Patent Application Publication No. H11-88123 discloses an art for easily performing the above-described auto presetting with a shorter time period.

However, receiving frequencies differ depending on areas and countries. When a user would like to listen to a broadcast while moving around for a pleasure or business trip, the user needs to repeat auto presetting each time a receiving location of a receiving frequency changes. This causes a problem that it takes time to be able to receive the broadcast.

Furthermore, even when a receiving frequency is prestored on the memory by presetting, the user needs to specify an area to which his current position belongs in order to set the receiving frequency. When the user does not find his current position in a foreign country, the user cannot identify his current position, thereby causing a problem that it takes time and effort to read a preset correct receiving frequency.

SUMMARY OF THE INVENTION

In order to solve the above problems, the present invention aims to provide a mobile phone having a broadcast receiving function that can promptly preset a receiving frequency depending on areas, and easily receive a broadcast at the receiving frequency, even when a user moves around for a pleasure or business trip and the like.

In order to solve the above problems, the present invention is a mobile phone including a broadcast receiving unit that receives a broadcast, including: a storage unit operable to store position information of a base station in correspondence with a receiving frequency of a broadcast station receivable in an area indicated by the position information; a position information acquisition unit operable to acquire position information of a base station; a judgment unit operable to judge whether the acquired position information of the base station is stored in the storage unit; and a receiving control unit operable to, when the acquired position information is stored, read the receiving frequency corresponding to the acquired position information, and instruct the broadcast receiving unit to receive the broadcast at the read receiving frequency.

With the above structure, when the receiving frequency of the broadcast station receivable in the area indicated by the position information is recorded in correspondence with the position information, upon acquiring the position information, the present invention can immediately set a receiving frequency of each broadcast station in the area indicated by the position information, and receive a broadcast at the receiving frequency. Therefore, the user does not need to repeat troublesome operations for setting a receiving frequency each time he moves around, and can easily and promptly receive a broadcast of a desired broadcast station in a location to which the user moves.

Here, the receiving control unit, when the acquired position information is not stored, may include: a frequency detection unit operable to perform auto preset processing of detecting a receiving frequency of a receivable broadcast station; and a recording unit operable to record the detected receiving frequency in correspondence with the acquired position information in the storage unit, and the receiving control unit, when the acquired position information is not stored, may instruct the broadcast receiving unit to receive the broadcast at the detected receiving frequency.

According to this, each time the user moves to an area where the user has never been before, a receiving frequency of a broadcast station receivable in the area is registered in correspondence with position information that indicates the area in the mobile phone. Therefore, a receiving frequency of a broadcast station receivable within a range where the user moves around can be registered in correspondence with position information for each range where the user moves around, in the mobile phone. Accordingly, when the user again moves to an area where the user has been before, the user can easily receive a broadcast of a desired broadcast station in the area, as the receiving frequency of the broadcast station receivable in the area has been registered in correspondence with the area in the mobile phone.

Here, the mobile phone may include: a table acquisition unit operable to acquire a frequency range correspondence table that shows a correspondence between area information that identifies a country or an area and a frequency range receivable in the identified country or area; and a specification receiving unit operable to receive a specification of a piece of area information, wherein the frequency detection unit may perform the auto preset processing within the frequency range corresponding to the specified area information.

According to this, the auto preset processing can be performed in accordance with a frequency range available in a country to which the area indicated by the position information belongs, thereby promptly detecting a receiving frequency of a broadcast station receivable in the area, without performing wasteful auto preset processing within an unavailable frequency range in the area.

Here, the frequency range correspondence table may show a correspondence among the area information, the frequency range, and an audio deemphasis amount in the identified country or area, the mobile phone may include an audio output unit operable to output audio, and the audio output unit may output the audio by deemphasizing an audio signal of the broadcast to be received based on the audio deemphasis amount corresponding to the specified area information.

According to this, an audio signal of a broadcast can be deemphasized based on an audio deemphasis amount in a country to which an area indicated by position information belongs, thereby enables the user to listen to a broadcast having a high audio quality.

Here, the mobile phone may further include: a reading time recording unit operable to, each time the receiving frequency is read by the receiving control unit, record a last reading time of the receiving frequency in correspondence with an area number corresponding to the receiving frequency in the storage unit; a monitoring unit operable to monitor the last reading time corresponding to the area number at a constant time interval; and a recording deletion unit operable to delete a recorded number of receive counts of the receiving frequency relating to the area number from the storage unit for which no less than a predetermined time period has passed since the last reading time of the receiving frequency.

According to this, a receiving frequency of a broadcast station in an area less needed for the user can be deleted first, thereby efficiently preventing wasteful consumption of a memory capacity for recording the receiving frequency less needed for the user.

Here, the mobile phone may further include: a number of read counts recording unit operable to, each time the receiving frequency is read by the receiving control unit, update a number of read counts of the receiving frequency, and record the updated number of read counts in correspondence with an area number corresponding to a read number of receive counts in the storage unit; a monitoring unit operable to monitor the number of read counts corresponding to the area number within a predetermined time period; and a recording deletion unit operable to, when the monitored number of read counts is less than a number of predetermined counts, delete a recorded number of receive counts of the receiving frequency relating to the area number corresponding to the number of read counts from the storage unit.

According to this, a receiving frequency of a broadcast station in an area to which the user less moves can be deleted first, thereby efficiently preventing wasteful consumption of the memory capacity for recording the receiving frequency less needed for the user.

Here, the monitoring unit may monitor whether a memory capacity of the storage unit is full, and the recording deletion unit, only when the memory capacity is full, may delete the recorded number of receive counts from the storage unit.

According to this, registration relating to a receiving frequency less needed for the user can be deleted first. Therefore, even when the memory capacity is full, a needed memory capacity can be kept without deleting registration relating to a receiving frequency more needed for the user.

BEST MODE FOR CARRYING OUT THE INVENTION

Figure 1:
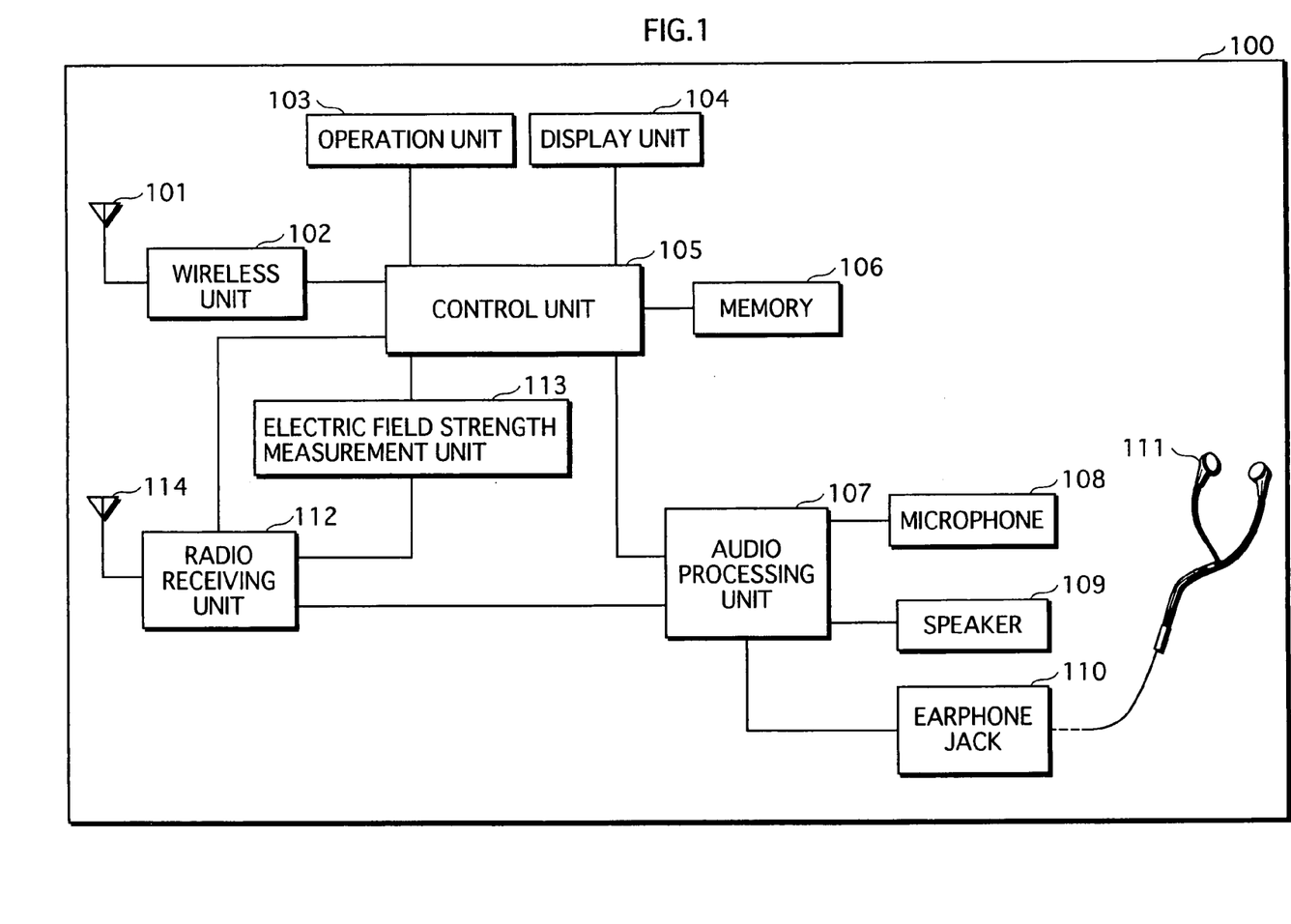
FIG. 1 is a functional block diagram showing a structure of a mobile phone 100 in an embodiment of the present invention.

FIG. 1 is a functional block diagram showing a structure of a mobile phone 100 in an embodiment of the present invention. The mobile phone 100, as shown in FIG. 1, is composed of an antenna 101, a wireless unit 102, an operation unit 103, a display unit 104, a control unit 105, a memory 106, an audio processing unit 107, a microphone 108, a speaker 109, an earphone jack 110, an earphone 111, a radio receiving unit 112, an electric field strength measurement unit 113, and a radio receiving antenna 114.

The wireless unit 102 receives base station information, an audio signal, and a communication signal including character data and image data that are transmitted from a base station (not illustrated) via the antenna 101, demodulates the message and signals, and outputs the demodulated message and signals to the control unit 105. Also, the wireless unit 102 modulates various data such as control data, audio data, character data, and image data that are inputted by the control unit 105, and transmits the modulated data to the base station via the antenna 101.

Here, the "base station information" indicates base station information defined in the second generation cordless telephone system standard RCR-STD-28 (RESEARCH AND DEVELOPMENT RADIO SYSTEM STANDARD-28). The base station information includes a base station identifier that identifies a transmission source base station, a country number for notifying of a country to which the base station belongs, an area number for identifying a call area to which the base station belongs (hereinafter "area number"), and the like.

The operation unit 103 receives various instructions and specifications from a user, and outputs the instructions and specifications to the control unit 105. For example, the operation unit 103 receives, from the user, a specification of area information that identifies a country or an area where the user is for starting roaming, and a specification of a frequency of a broadcast station to be selected, and outputs these specifications to the control unit 105.

The display unit 104 displays a character and an image based on the character data and the image data inputted by the control unit 105.

The memory 106 stores a broadcast station detection limit, a country frequency range correspondence table, a preset frequency registration table, and the like.

Here, the "broadcast station detection limit" indicates a threshold value of an electric field strength of a receiving signal, the threshold value being a judgment standard whether to register a receiving frequency that is preset in the preset frequency registration table as a preset receiving frequency in auto preset processing performed by the control unit 105 described later.

Also, the "country frequency range correspondence table" indicates a table that shows a correspondence depending on countries and areas among a frequency band range of an FM radio broadcast station (hereinafter "frequency range"), a step frequency that shows a change width of a frequency for searching the FM radio broadcast station, and an audio deemphasis amount.

Here, the "audio deemphasis amount" indicates a deemphasis invariable used in FM radio broadcasts and the like, for performing deemphasis in order to lower a high frequency of a transmitting signal that is heightened to enhance audio quality to an original frequency level in a reception source. As the deemphasis invariable, either of two types of 50 μS and 75 μS are used depending on countries and areas.

Figure 2:
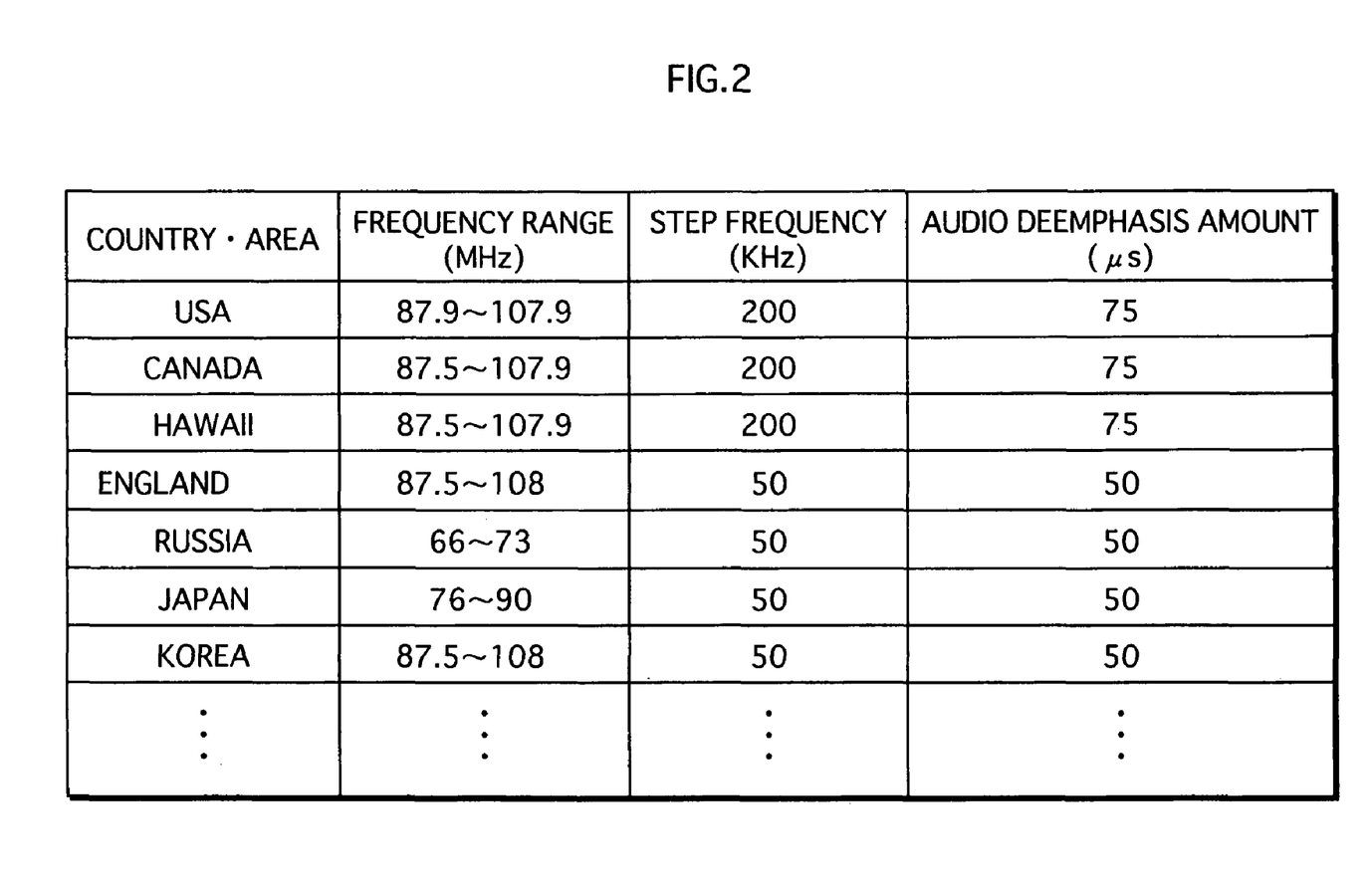
FIG. 2 shows a specific example of a country frequency range correspondence table.

FIG. 2 shows a specific example of the country frequency range correspondence table.

Figure 3:
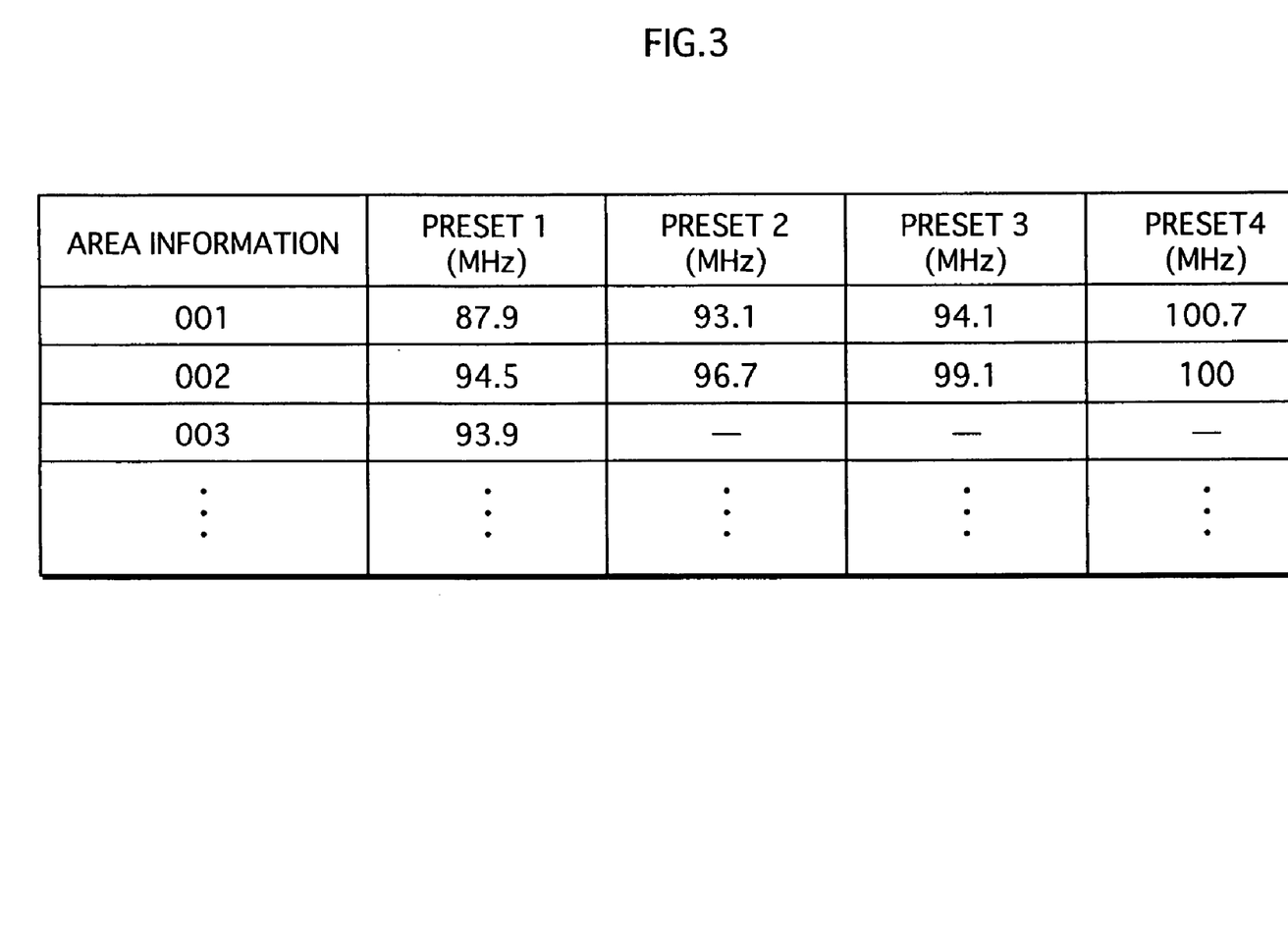
FIG. 3 shows a specific example of a preset frequency registration table.

Also, the "preset frequency registration table" indicates a table that shows a correspondence between an area number and a receiving frequency of each FM radio broadcast station receivable in an area shown by the area number.

FIG. 3 shows a specific example of the preset frequency registration table.

The audio processing unit 107 deemphasizes an audio signal inputted by the radio receiving unit 112 based on an audio deemphasis amount specified by the control unit 105, D/A converts the audio signal, outputs the audio signal to the earphone 111 via the earphone jack 110. Also, the audio processing unit 107 A/D converts an audio signal inputted by the microphone 108, and outputs the audio signal to the control unit 105.

Also, the audio processing unit 107 D/A converts audio data inputted by the control unit 105, and outputs the audio data to the speaker 109.

The radio receiving unit 112 receives an FM electric wave at a receiving frequency specified by the control unit 105 via the radio receiving antenna 114, and outputs the FM electric wave to the electric field strength measurement unit 113 and the audio processing unit 107.

The electric field strength measurement unit 113 measures an electric field strength of the FM electric wave inputted by the radio receiving unit 112, and outputs a measurement result to the control unit 105.

The control unit 105 is composed of a microprocessor, a ROM (Read Only Memory), a RAM (Random Access Memory), and the like, performing radio broadcast receiving preprocessing, auto preset processing, and radio broadcast receiving processing as described below, in accordance with a control program stored on the ROM.

(Radio Broadcast Receiving Preprocessing)

Figure 4:
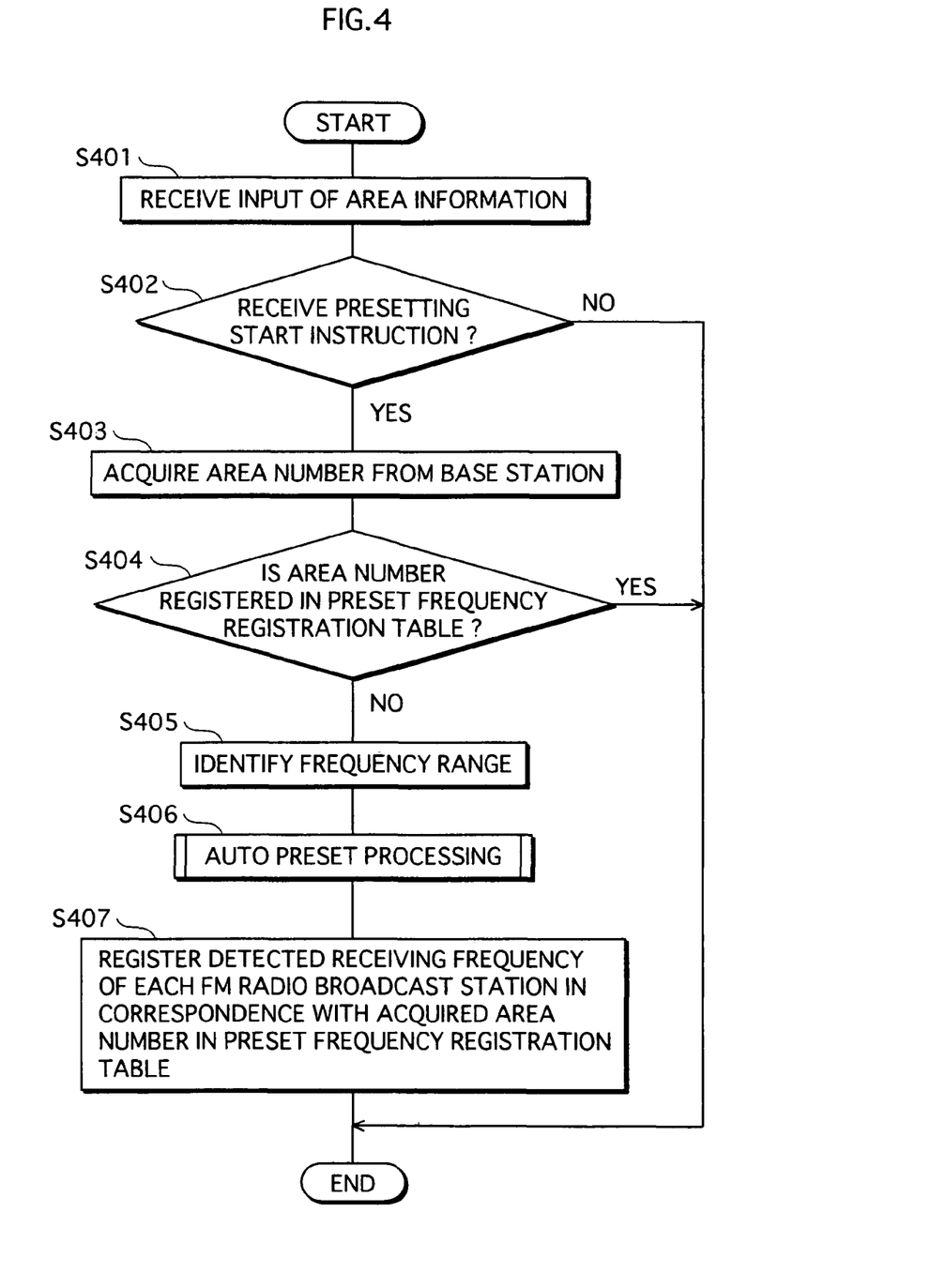
FIG. 4 is a flowchart showing operations for radio broadcast receiving preprocessing by a control unit 105.

FIG. 4 is a flowchart showing the operations for the radio broadcast receiving preprocessing performed by the control unit 105. The operations will be described with reference to FIG. 4.

The control unit 105 receives a specification of area information from the user via the operation unit 103 (STEP S401). On further receiving a presetting start instruction from the user via the operation unit 103 (STEP S402: Y), the control unit 105 acquires base station information transmitted from a base station whose position is registered via the wireless unit 102, acquires an area number from the base station information (STEP S403), refers to the preset frequency registration table stored on the memory 106 to judge whether the acquired area number is registered in the preset frequency registration table (STEP S404).

When the acquired area number is not registered (STEP S404: N), the control unit 105 refers to the country frequency range correspondence table stored on the memory 106 to identify a frequency range corresponding to the received area information (STEP S405), performs the auto preset processing described later (STEP S406), and registers a receiving frequency of each FM radio broadcast station detected by the auto preset processing in correspondence with the acquired area number, in the preset frequency registration table (STEP S407).

In STEP S404, when the acquired area number is registered in the preset frequency registration table (STEP S404: Y), the control unit 105 ends the radio broadcast receiving preprocessing.

(Auto Preset Processing)

Figure 5:
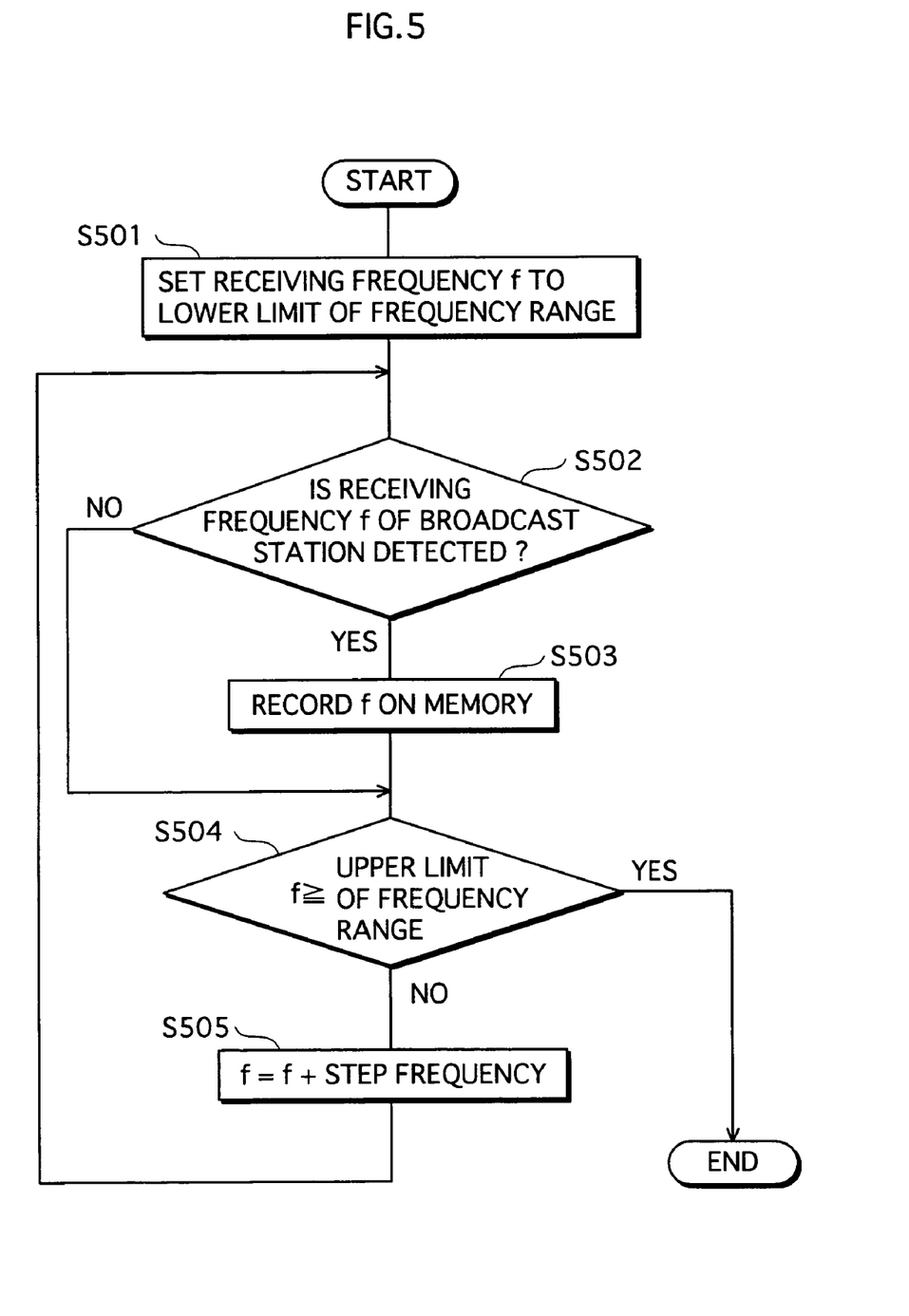
FIG. 5 is a flowchart showing operations for auto preset processing by the control unit 105.

FIG. 5 is a flowchart showing the operations for the auto preset processing performed by the control unit 105. The operations will be described with reference to FIG. 5.

The control unit 105 sets the receiving frequency to a lower limit of the frequency range identified in STEP S405 shown in FIG. 4 (STEP S501), instructs the radio receiving unit 112 to receive an FM electric wave at the set receiving frequency. When a measured value of an electric field strength of the FM electric wave instructed to be received is inputted by the electric field strength measurement unit 113, the control unit 105 judges whether a receiving frequency of an FM radio broadcast station has been detected depending on whether the inputted measured value exceeds a broadcast station detection limit stored on the memory 106 (STEP S502).

When the inputted measured value exceeds the broadcast station detection limit, and the receiving frequency of the FM radio broadcast station is judged to have been detected (STEP S502: Y), the control unit 105 records the detected receiving frequency in the memory 106 (STEP S503), and judges whether the receiving frequency at which the radio receiving unit 112 is instructed to receive the FM electric wave is no less than an upper limit of the identified frequency range (STEP S504).

When the receiving frequency the radio receiving unit 112 is instructed to receive is less than the upper limit of the identified frequency range (STEP S504: N), the control unit 105 refers to the country frequency range correspondence table stored on the memory 106 to identify a step frequency corresponding to the area information received in STEP S401 shown in FIG. 4, and increases the receiving frequency by the identified step frequency (STEP S505). The control unit 105 instructs the radio receiving unit 112 to receive the FM electric wave at the increased receiving frequency, and proceeds to STEP S502.

In STEP S504, when the receiving frequency the radio receiving unit 112 is instructed to receive is no less than the upper limit of the identified frequency range (STEP S504: Y), the control unit 105 ends the auto preset processing.

(Radio Broadcast Receiving Processing)

Figure 6:
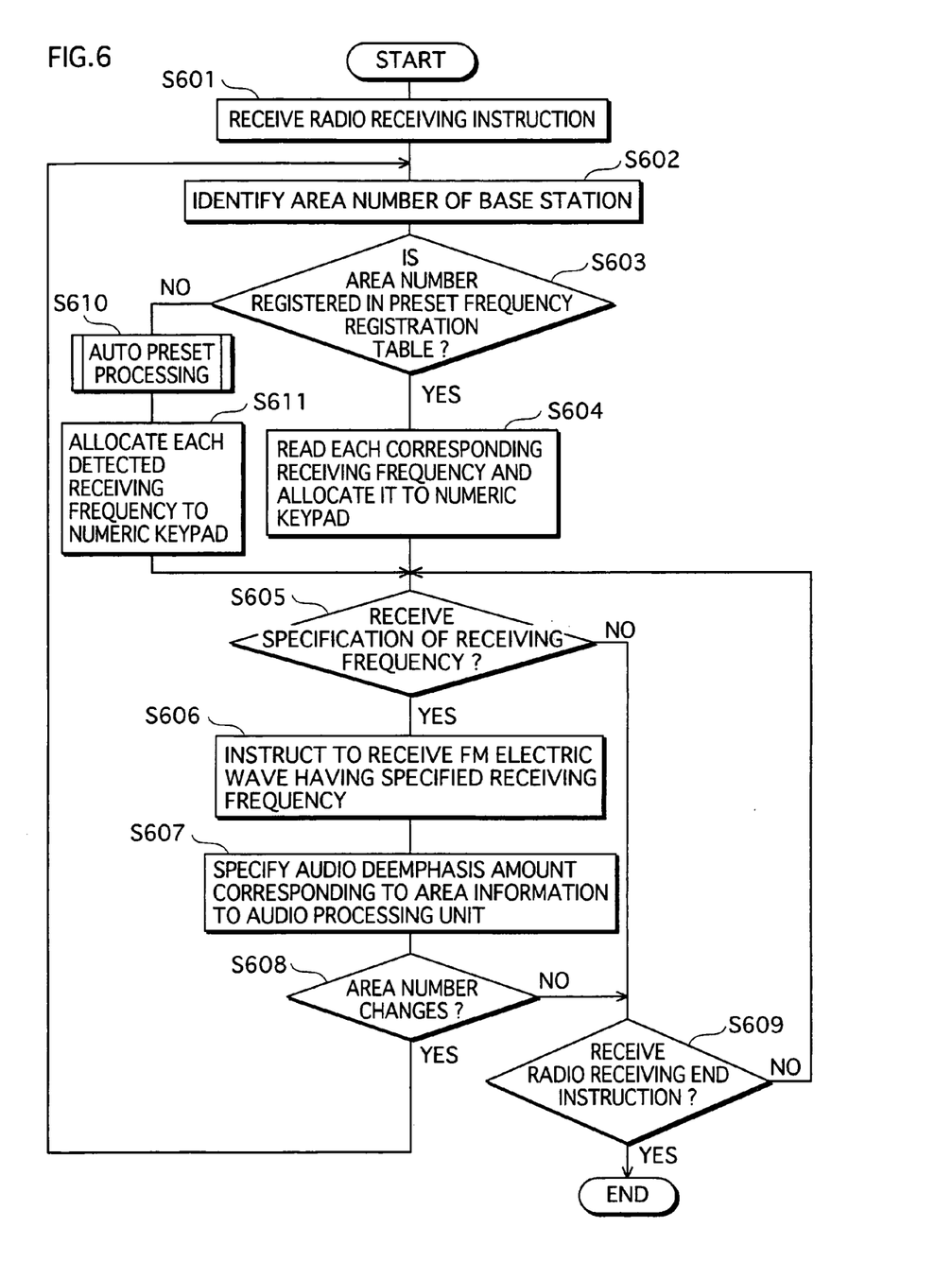
FIG. 6 is a flowchart showing operations for radio broadcast receiving processing by the control unit 105.

FIG. 6 is a flowchart showing the operations for the radio broadcast receiving processing performed by the control unit 105. The operations will be described with reference to FIG. 6.

Upon receiving a radio receiving instruction from the user via the operation unit 103 (STEP S601), the control unit 105 acquires base station information transmitted from the base station whose location is registered via the wireless unit 102, identifies an area number by acquiring the area number from the acquired base station information (STEP S602), and judges whether the area number is registered in the preset frequency registration table stored on the memory 106 (STEP S603).

When the area number is registered (STEP S603: Y), the control unit 105 reads a receiving frequency of each FM radio broadcast station corresponding to the identified area number from the preset frequency registration table, and allocates a receiving instruction of the read receiving frequency to a key of a numeric keypad (not illustrated) of the operation unit 103 in ascending order of frequencies (STEP S604). The control unit 105 correlates a receiving frequency of a receiving instruction and a key of the numeric keypad. For example, when a key "1" of the numeric keypad is pressed by the user, the control unit 105 outputs a receiving instruction of a lowest receiving frequency to the radio receiving unit 112. When a key "2" of the numeric keypad is pressed, the control unit 105 outputs a receiving instruction of a second lowest receiving frequency to the radio receiving unit 112.

Next, upon receiving a specification of a receiving frequency from the user via the numeric keypad of the operation unit 103 (STEP S605: Y), the control unit 105 instructs the radio receiving unit 112 to receive an FM electric wave at the specified receiving frequency (STEP S606), refers to the country frequency range correspondence table stored on the memory 106 to identify an audio deemphasis amount corresponding to the area information received in STEP S401 shown in FIG. 4, specifies the identified audio deemphasis amount to the audio processing unit 107 (STEP S607), and monitors whether the area number acquired from the base station information received via the wireless unit 102 is changed (STEP S608).

When the area number is changed (STEP S608: Y), the control unit 105 proceeds to STEP S602. When the area is not changed (STEP S608: N), the control unit 105 judges whether a radio receiving end instruction is received from the user via the operation unit 103 (STEP S609). When the radio receiving end instruction is not received (STEP S605: N), the control unit 105 proceeds to STEP S609.

In STEP S605, when not receiving the receiving instruction of the receiving frequency from the user (STEP S605: N), the control unit 105 proceeds to STEP S609.

In STEP S603, when the specified area number is not registered in the preset frequency registration table stored on the memory 106 (STEP S603: N), the control unit 105 performs the auto preset processing (STEP S610), registers a receiving frequency of each FM radio broadcast station detected by the auto preset processing in correspondence with the acquired area number in the preset frequency registration table, and also allocates receiving instruction of each detected receiving frequency to a key of the numeric keypad (not illustrated) of the operation unit 103 in ascending order of frequencies (STEP S611), and proceeds to STEP S605.

While the mobile phone 100 according to the present invention has been described based on the embodiment, the present invention is not limited to the embodiment.

(1) For example, in the embodiment, the mobile phone 100 performs the radio broadcast receiving preprocessing, the auto preset processing, and the radio receiving processing, for FM electric waves. However, the mobile phone 100 may perform this kind of processing for AM electric waves.

Also, instead of or in addition to the radio receiving antenna 114 and the radio receiving unit 112, the mobile phone 100 may include, as a compositional element, a television receiving antenna and a television receiving unit for receiving television broadcasts, and perform this kind of processing for received television broadcast electric waves.

(2) Also, in the embodiment, the auto preset processing is performed for each area number included in the base station information transmitted from the base station, and the receiving frequency of each FM radio broadcast station detected by the auto preset processing is registered in the preset frequency registration table. However, instead of for each area number, the auto preset processing may be performed for each base station identifier included in the base station information.

Specifically, each time a base station identifier included in base station information changes, the mobile phone 100 may perform the auto preset processing, and register a receiving frequency of each FM radio broadcast station detected by the auto preset processing in correspondence with the base station identifier in the preset frequency registration table.

Furthermore, by including the components of (1) for receiving television broadcasts, the mobile phone 100 may perform this kind of registration processing for television broadcast stations.

(3) Also, in the embodiment, the memory 106 of the mobile phone 100 stores the country frequency range table. However, an external server may store the country frequency range table, and the mobile phone 100 may acquire the table via the Internet.

(4) Also, in the embodiment, the mobile phone 100 acquires the area information by the user input. However, the area information may be included in base station information and acquired from the base station information.

(5) Also, the following may be employed: each time it reads a receiving frequency from the preset frequency registration table, the control unit 105 acquires a time at the reading, registers the reading time in correspondence with an area number in the preset frequency registration table. Furthermore, the control unit 105 monitors each reading time at a constant time interval, and deletes a receiving frequency relating to an area number for which a predetermined time period or longer has passed since the last reading time, from the preset frequency registration table.

Furthermore, by including the compositional elements of (1) for receiving television broadcasts, the mobile phone 100 may perform this kind of deletion processing for television broadcast stations.

According to this, a receiving frequency of radio stations and television stations in an area less needed for the user can be deleted first, thereby efficiently preventing wasteful consumption of the memory capacity for registering less needed receiving frequencies.

(6) Also, the following may be employed: each time it reads a receiving frequency from the preset frequency registration table, the control unit 105 updates the number of read counts, registers the updated number of read counts in correspondence with an area number corresponding to the read receiving frequency in the preset frequency registration table, and monitors whether the number of read counts within a predetermined time period is less than a predetermined number of counts. When the number of read counts is less, the control unit 105 deletes the receiving frequency corresponding to the area number from the preset frequency table.

Furthermore, by including the compositional elements of (1) for receiving television broadcasts, the mobile phone 100 may perform this kind of deletion processing for television broadcast stations.

According to this, a receiving frequency of radio stations and television stations in an area to which the user less moves can be deleted first, thereby efficiently preventing wasteful consumption of the memory capacity for registering less used receiving frequencies.

(7) Also, the control unit 105 may monitor whether the memory capacity is full. Only when the memory capacity is full, the control unit 105 may perform the above-described deletion processing in (5) and (6).

According to this, registration relating to a receiving frequency less needed for the user can be deleted first. When the memory capacity is full, a needed memory capacity can be kept without deleting registration relating to a receiving frequency more needed for the user.

INDUSTRIAL APPLICABILITY

The present invention can be used as an art for easily presetting receiving frequencies and receiving broadcasts in a mobile phone having a broadcast receiving function.

The invention claimed is:

1. A mobile phone including a broadcast receiving unit that receives a broadcast, comprising:
   a storage unit operable to store position information of a base station in correspondence with a receiving frequency of a broadcast station receivable in an area indicated by the position information;
   a position information acquisition unit operable to acquire position information of a base station;
   a judgment unit operable to judge whether the acquired position information of the base station is stored in the storage unit;
   a receiving control unit operable to, in response to a receiving instruction from a user, read the receiving frequency stored in correspondence with the acquired position information from the storage unit, and have the broadcast receiving unit receive a broadcast of a broadcast station at the read receiving frequency;

a reading time recording unit operable to, each time the receiving frequency is read by the receiving control unit, record a last reading time of the receiving frequency in correspondence with the position information corresponding to the receiving frequency in the storage unit;

a monitoring unit operable to monitor the last reading time corresponding to the position information at a constant time interval; and a recording deletion unit operable to delete the recorded receiving frequency corresponding to the position information from the storage unit for which no less than a predetermined time period has passed since the last reading time of the receiving frequency.

2. The mobile phone of claim 1, including:

a table acquisition unit operable to acquire frequency range correspondence table that shows a correspondence between area information that identifies a country or an area and a frequency range receivable in the identified country or area; and a specification receiving unit operable to receive a specification of a piece of area information, wherein the additional recording unit attempts to detect a receiving frequency of a broadcast station having a receiving intensity of no less than the predetermined level within the frequency range corresponding to the specified piece of area information.

3. The mobile phone of claim 2, wherein the frequency range correspondence table shows a correspondence among the area information, the frequency range, and an audio deemphasis amount in the identified country or area, the mobile phone includes an audio output unit operable to output audio, and the audio output unit outputs the audio by deemphasizing an audio signal of the broadcast to be received broadcast based on the audio deemphasis amount corresponding to the specified area information.

4. The mobile phone of claim 1, further comprising:

a number of read counts recording unit operable to, each time the receiving frequency is read by the receiving control unit, update a number of read counts of the receiving frequency, and record the updated number of read counts in correspondence with the position information corresponding. to the read receiving frequency in the storage unit;

a monitoring unit operable to monitor the number of read counts corresponding to the position information within a predetermined time period; and a recording deletion unit operable to, when the monitored number of read counts is less than a number of predetermined counts, delete the recorded receiving frequency corresponding to the position information corresponding to the number of read counts from the storage unit.

5. The mobile phone of claim 1, wherein the monitoring unit monitors whether a memory capacity of the storage unit is full, and the recording deletion unit, only when the memory capacity is full, deletes the recorded receiving frequency from the storage unit.

6. The mobile phone of claim 1, wherein the position information is position information of a call area to which the base station belongs.

7. The mobile phone of claim 5, wherein the position information is position information of a call area to which the base station belongs.

8. The mobile phone of any of claim 1, wherein the broadcast is a television broadcast or a radio broadcast.

9. The mobile phone of claim 5, wherein the broadcast is a television broadcast or a radio broadcast.

10. The mobile phone of claim 6, wherein the broadcast is a television broadcast or a radio broadcast.

11. The mobile phone of claim 7, wherein the broadcast is a television broadcast or a radio broadcast.

12. The mobile phone of claim 4, wherein the monitoring unit monitors whether a memory capacity of the storage unit is full, and the recording deletion unit, only when the memory capacity is full, deletes the recorded receiving frequency from the storage unit.

13. The mobile phone of claim 2, wherein the position information is position information of a call area to which the base station belongs.

14. The mobile phone of claim 3, wherein the position information is position information of a call area to which the base station belongs.

15. The mobile phone of claim 1, wherein the position information is position information of a call area to which the base station belongs.

16. The mobile phone of claim 4, wherein the position information is position information of a call area to which the base station belongs.

17. The mobile phone of claim 2, wherein the position information is position information of a call area to which the base station belongs.

18. The mobile phone of claim 3, wherein the broadcast is a television broadcast or a radio broadcast.

19. The mobile phone of claim 1, wherein the broadcast is a television broadcast or a radio broadcast.

20. The mobile phone of claim 4, wherein the broadcast is a television broadcast or a radio broadcast.

21. The mobile phone of claim 1 further comprising:

an additional recording unit operable to, when the acquired position information is not stored, attempt to detect a receiving frequency of a broadcast station having a receiving intensity of no less than a predetermined level within a frequency range defined for an area indicated by the acquired position information, and additionally record all detected receiving frequencies of broadcast stations in correspondence with the acquired position information in the storage unit.

22. A method of pre-setting a receiving frequency in a mobile communications device having a broadcast receiving function, the method comprising:

storing position information of a base station in correspondence with a receiving frequency of a broadcast station receivable in an area indicated by the position information;

acquiring position information of a base station;

determining whether the acquired position information of the base station is stored in the storage unit;

in response to a receiving instruction from a user, reading the detected receiving frequency stored in correspondence with the acquired position information from the storage unit, and receiving a broadcast of a broadcast station at the read receiving frequency;

each time the receiving frequency is read by the receiving control unit, recording a last reading time of the receiving frequency in correspondence with the position information corresponding to the receiving frequency in the storage unit;

monitoring the last reading time corresponding to the position information at a constant time interval; and deleting the recorded receiving frequency corresponding to the position information from the storage unit for which no less than a predetermined time period has passed since the last reading time of the receiving frequency.

23. A mobile phone including a broadcast receiving unit that receives a broadcast, comprising:
   a storage unit operable to store position information of a base station in correspondence with a receiving frequency of a broadcast station receivable in an area indicated by the position information;
   a position information acquisition unit operable to acquire position information of a base station;
   a judgment unit operable to judge whether the acquired position information of the base station is stored in the storage unit;
   an additional recording unit operable to, when the acquired position information is not stored, attempt to detect a receiving frequency of a broadcast station having a receiving intensity of no less than a predetermined level within a frequency range defined for an area indicated by the acquired position information, and additionally record all detected receiving frequencies of broadcast stations in correspondence with the acquired position information in the storage unit;
   a receiving control unit operable to, in response to a receiving instruction from a user, read the detected receiving frequencies stored in correspondence with the acquired position information from the storage unit, and have the broadcast receiving unit receive a broadcast of a broadcast station at the read receiving frequencies;
   a number of read counts recording unit operable to, each time the receiving frequency is read by the receiving control unit, update a number of read counts of the receiving frequency, and record the updated number of read counts in correspondence with the position information corresponding. to the read receiving frequency in the storage unit;
   a monitoring unit operable to monitor the number of read counts corresponding to the position information within a predetermined time period; and
   a recording deletion unit operable to, when the monitored number of read counts is less than a number of predetermined counts, delete the recorded receiving frequency corresponding to the position information corresponding to the number of read counts from the storage unit.

24. A method of pre-setting a receiving frequency in a mobile communications device having a broadcast receiving function, the method comprising:
   storing position information of a base station in correspondence with a receiving frequency of a broadcast station receivable in an area indicated by the position information;
   acquiring position information of a base station;
   determining whether the acquired position information of the base station is stored in the storage unit;
   if the acquired position information is not stored, attempting to detect a receiving frequency of a broadcast station having a receiving intensity of no less than a predetermined level within a frequency range defined for an area indicated by the acquired position information, and recording all detected receiving frequencies of broadcast stations in correspondence with the acquired position information in the storage unit;
   in response to a receiving instruction from a user, reading the detected receiving frequencies stored in correspondence with the acquired position information from the storage unit, and receiving a broadcast of a broadcast station at the read receiving frequencies;
   each time the receiving frequency is read by the receiving control unit, updating a number of read counts of the receiving frequency, and recording the updated number of read counts in correspondence with the position information corresponding to the read receiving frequency in the storage unit;
   monitoring the number of read counts corresponding to the position information within a predetermined time period; and
   when the monitored number of read counts is less than a number of predetermined counts, deleting the recorded receiving frequency corresponding to the position information corresponding to the number of read counts from the storage unit.

* * * * *